July 11, 1944.     G. K. DAY     2,353,295
DRILL BUSHING
Filed March 8, 1943
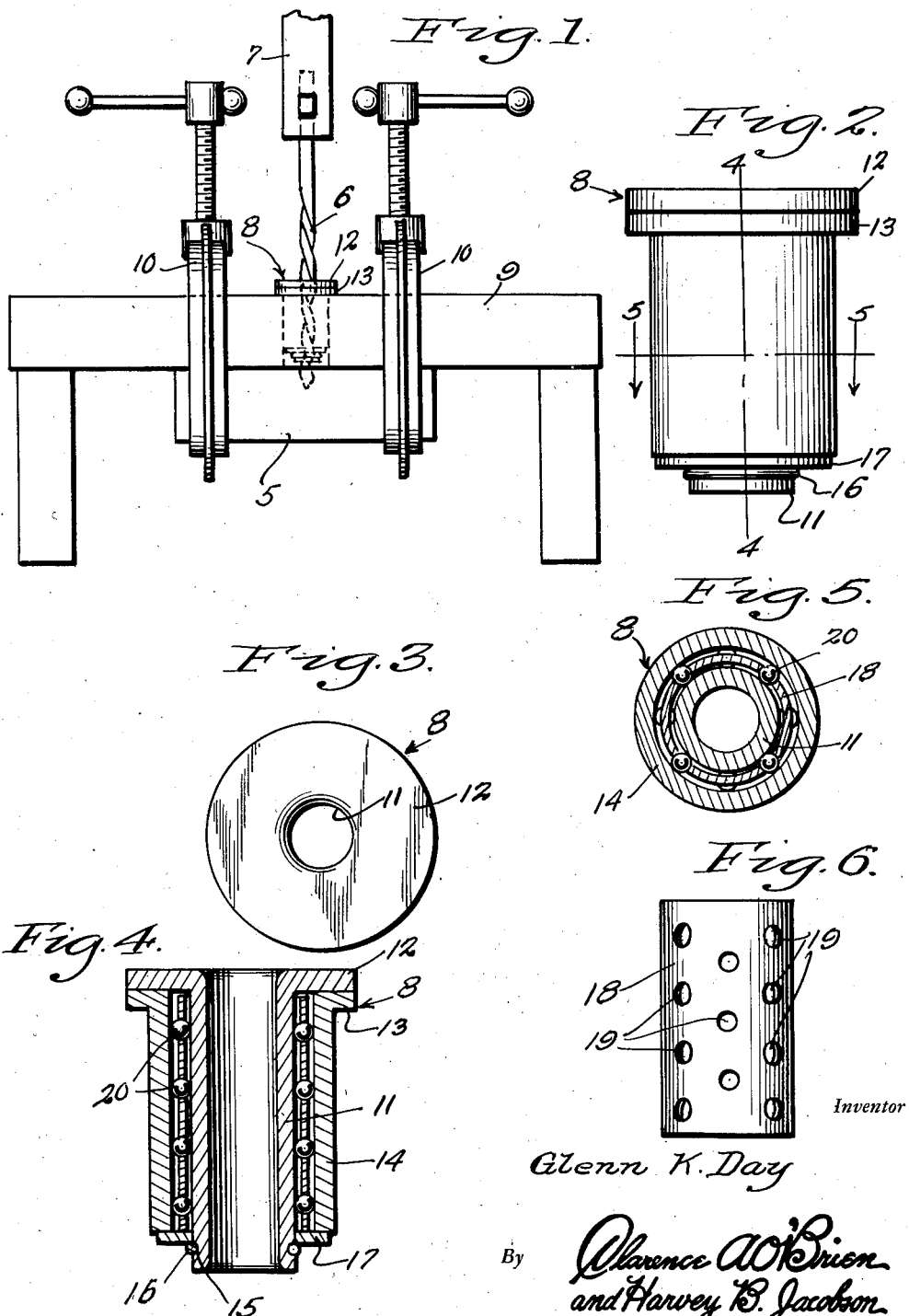
Inventor
Glenn K. Day
By Clarence A. O'Brien
and Harvey B. Jacobson
Attorneys Patented July 11, 1944

2,353,295

UNITED STATES PATENT OFFICE 2,353,295

DRILL BUSHING

Glenn K. Day, Washington, D. C.

Application March 8, 1943, Serial No. 478,483

1 Claim. (Cl. 77—62)

This invention relates to new and useful improvements in bushings or bearings for drills, the principal object of the invention being to provide a drill bushing which is anti-frictional and serves to prevent sticking, warping or deflection from a true line of operation.

Another important object of the invention is to provide a bearing bushing of the character stated which can be mounted on practically any type of work holder for accommodating drills and like tools, the bushing serving to minimize galling and breakage of drills while in operation.

Other objects and advantages of the invention will become apparent to the reader of the following description.

In the drawing:

Figure 1 represents a side elevational view of a work holder showing the bushing mounted in position for receiving a drill.

Figure 2 is a side elevational view of the bushing structure.

Figure 3 is a top plan view.

Figure 4 is a vertical sectional view taken on the line 4—4 of Figure 3.

Figure 5 is a cross section on the line 5—5 of Figure 2.

Figure 6 is a side elevational view of the ball-bearing carrier sleeve.

Referring to the drawing wherein like numerals designate like parts, it can be seen in Figure 1, that numeral 5 denotes a piece of work to be drilled by a drill 6 held in a chuck 7. Numeral 8 generally refers to the improved drill bushing through which the drill 6 is disposed and operates.

It is to be understood that this bushing 8 can be mounted in substantially any type of table or jig 9, the drawing of this application disclosing a table 9 on which are clamp units 10, 10 for holding the work 5 in a definite position.

The bushing 8 comprises a barrel 11 through which the drill 6 is disposed as substantially shown in Figure 1. The barrel 11 has a circumferential flange 12 at its upper end which overlaps a flange 13 at the upper end of a sleeve 14. The barrel 11 is substantially longer than the sleeve 14, depending below the lower end thereof, where it is formed with a circumferential groove 15 adapted to accommodate a split spring ring 16, this ring being adapted to be disposed in the groove to hold a washer 17 against the lower end of the sleeve 14.

Within the space between the barrel 11 and the sleeve 14 is a ball bearing assembly and this consists of a tube 18 having a plurality of openings 19 therein, in each of which is located a ball bearing 20, which rides both the outer surface of the barrel 11 and the inner surface of the sleeve 14. Obviously, the barrel 11 will turn within the sleeve 14, guiding the drill 6 and preventing any misalignment thereof.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A drill bushing comprising a barrel for receiving a drill, a sleeve surrounding the barrel, bearing means between the barrel and the sleeve and means for preventing displacement of the sleeve from the barrel, said means for preventing displacement of the sleeve from the barrel comprising a flange on one end of the barrel overlapping one end of the sleeve, a washer for the other end of the barrel overlapping the adjacent end of the sleeve and means for preventing displacement of the washer from the barrel, said means for preventing displacement of the washer consisting in forming the adjacent portion of the barrel with a circumferential groove, and a split spring ring disposed in the groove and abutting the said washer.

GLENN K. DAY.